United States Patent
Kimishima et al.

(10) Patent No.: US 6,481,230 B2
(45) Date of Patent: Nov. 19, 2002

(54) VEHICLE BATTERY COOLING APPARATUS

(75) Inventors: Masahiro Kimishima, Tochigi-ken; Hiroshi Echigoya, Utsunomiya, both of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/977,176

(22) Filed: Oct. 12, 2001

(65) Prior Publication Data
US 2002/0043413 A1 Apr. 18, 2002

(30) Foreign Application Priority Data
Oct. 13, 2000 (JP) ......................................... 2000-313998

(51) Int. Cl.[7] .................................................. B60H 1/32
(52) U.S. Cl. ...................... 62/239; 62/238.7; 62/259.2
(58) Field of Search ................................ 62/239, 238.7, 62/259.2, 238.6, 237, 243, 245, 134

(56) References Cited

U.S. PATENT DOCUMENTS 4,415,847 A * 11/1983 Galloway ....................... 320/2
5,937,644 A * 8/1999 Matsuno et al. ............. 62/259.2
6,138,466 A * 10/2000 Lake et al. ..................... 62/199
6,394,210 B2 * 5/2002 Matsuda et al. ............. 180/68.1

FOREIGN PATENT DOCUMENTS

| JP | 5-344606 | 12/1993 |
| JP | 7-105988 | 4/1995 |

* cited by examiner

*Primary Examiner*—Denise L. Esquivel
*Assistant Examiner*—Melvin Jones
(74) *Attorney, Agent, or Firm*—Merchant & Gould, P.C.

(57) ABSTRACT

The passenger compartment air-conditioning apparatus has a second heat exchanger disposed adjacent to and in front of a first heat exchanger for cooling a cooling liquid of a battery. When the temperature of the battery is increased at the time the battery is charged in a quick charge mode, a compressor of the passenger compartment air-conditioning apparatus is actuated by a coaction of a battery ECU and an air-conditioning ECU to supply a refrigerant to the second heat exchanger. A fan is rotated to cool external air with the second heat exchanger. The cooled external air is introduced into the first heat exchanger, which cools the cooling liquid of the battery.

9 Claims, 6 Drawing Sheets

FIG. 5 DEHUMIDIFYING HEATING MODE

FIG. 6 HEATING MODE

VEHICLE BATTERY COOLING APPARATUS

BACKGROUND OF THE INVENTION

1. Field of the Invention

The present invention relates to an apparatus for cooling a battery on an electric vehicle or the like which is propelled by an electric motor as a propulsion source that is powered by the battery.

2. Description of the Related Art

As well known in the art, a battery mounted on an electric vehicle or the like generates heat when it is charged or discharged. When the temperature of the battery rises due to the generated heat, the efficiency of the battery tends to be lowered or the battery tends to be degraded. Therefore, the battery needs to be cooled especially when it is charged in a quick charge mode.

To cool such a battery mounted on an electric vehicle or the like, the battery is associated with a cooling apparatus.

Attempts to cool a battery with a cooling apparatus include a proposal (hereinafter referred to as "first technical proposal") disclosed in Japanese laid-open patent publication No. 5-344606 and a proposal (hereinafter referred to as "second technical proposal") disclosed in Japanese laid-open patent publication No.7-105988.

According to the first technical proposal, a battery on an electric vehicle is placed in an air-conditioning cycle of an air-conditioning system on the electric vehicle, and cooled by a refrigerant used in the air-conditioning system.

According to the second technical proposal, a portion of a water cooling passage of a battery is disposed in an absorption refrigerator to cool battery cooling water.

However, the first technical proposal is disadvantageous in that a refrigerant passage needs to extend into a battery box which houses the battery, making the battery box difficult to handle and also increasing the cost due to difficulty in installing a piping for the refrigerant passage.

The second technical proposal is also problematic in that the absorption refrigerator requires an additional installation space and increases the cost of the cooling apparatus.

SUMMARY OF THE INVENTION

It is therefore an object of the present invention to provide a vehicle battery cooling apparatus which is simple in structure and low in cost, and is capable of cooling a battery highly efficiently.

Another object of the present invention is to provide a vehicle battery cooling apparatus which is capable of providing an optimum cooling arrangement depending on the temperature of a battery to be cooled.

Still another object of the present invention is to provide a vehicle battery cooling apparatus which is highly reliable in operation.

According to the present invention, there is provided an apparatus for cooling a battery mounted on a vehicle, comprising first cooling means for cooling a cooling liquid to cool the battery with external air introduced by a fan, and second cooling means disposed adjacent to and in front of the first cooling means in a forward direction of the vehicle, for cooling the first cooling means with a passenger compartment air-conditioning apparatus on the vehicle.

Since the apparatus for cooling the battery is of a simple structure including the first cooling means for cooling the battery with external air and the second cooling means for cooling the battery with the passenger compartment air-conditioning apparatus, the apparatus needs a small installation space and minimizes any increase in its cost.

The apparatus also has temperature detecting means for detecting a battery temperature of the battery, and control means connected to the temperature detecting means and the first and second cooling means, for controlling operation of the first and second cooling means based on the battery temperature detected by the temperature detecting means. When the battery is charged in a quick charge mode, for example, the control means operates both the first and second cooling means, thus providing an optimum cooling arrangement depending on the battery temperature.

The control means comprises means for operating only the first cooling means to cool the battery when the battery temperature detected by the temperature detecting means is increasing and exceeds a predetermined reference temperature, and operating both the first and second cooling means to cool the battery when the battery temperature detected by the temperature detecting means is increasing further and exceeds a predetermined reference temperature higher than the above predetermined reference temperature. The apparatus is thus capable of efficiently cooling the battery with a power controllable depending on the battery temperature.

The first cooling means comprise a first heat exchanger disposed outside of a passenger compartment of the vehicle, for cooling the cooling liquid, and the second cooling means comprises a second heat exchanger branched from a refrigerant circulation passage of the passenger compartment air-conditioning apparatus and disposed outside of the passenger compartment. The apparatus for cooling the battery is thus of a simple arrangement.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
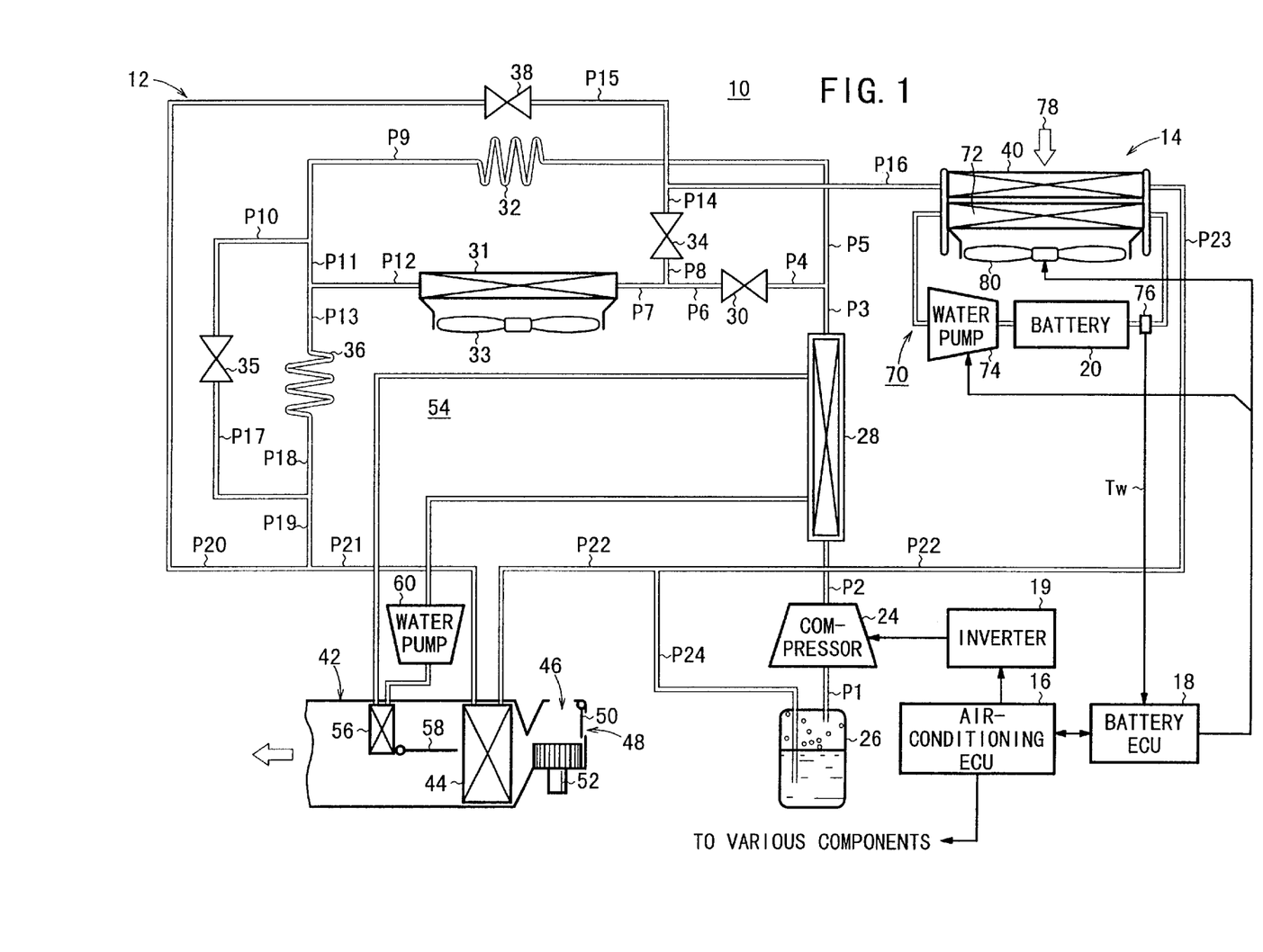
FIG. 1 is a block diagram of an air-conditioning system for use in an electric vehicle which incorporates a vehicle battery cooling apparatus according to the present invention.

FIG. 1 shows in block form an air-conditioning system 10 for use in an electric vehicle which incorporates a vehicle battery cooling apparatus according to the present invention.

As shown in FIG. 1, the air-conditioning system 10, which is installed on an electric vehicle, not shown, comprises a passenger compartment air-conditioning apparatus 12, a battery cooling apparatus 14, an air-conditioning ECU 16 as a control means for controlling various components of the passenger compartment air-conditioning apparatus 12, and a battery ECU 18 for controlling various components of the battery cooling apparatus 14 in coaction with the air-conditioning ECU 16.

Each of the battery ECU 18 and the air-conditioning ECU 16 comprises a microcomputer having a CPU (Central Processing Unit), a ROM (Read-Only Memory), a RAM (Random-Access Memory), an A/D converter, an output interface, etc. The battery ECU 18 and the air-conditioning ECU 16 may be combined into a single ECU.

The electric vehicle has a battery 20 and an electric motor (not shown) which is energizable by the battery 20 to propel the electric vehicle.

The passenger compartment air-conditioning apparatus 12 has a compressor 24 which can be actuated by an inverter 19 that is controlled by the air-conditioning ECU 16.

The compressor 24 has an inlet connected by a pipe P1 to a receiver tank 26 which stores a refrigerant and an outlet connected by a pipe P2 to an inlet of a heat exchanger 28.

The heat exchanger 28 has an outlet connected to a pipe P3 that is branched into pipes P4, P5 which are connected respectively to an end of a cooler valve 30 and an end of a heater capillary tube 32.

The cooler valve 30 has an outlet connected to a pipe P6 that is branched into pipes P7, P8 which are connected respectively to an end of a heat exchanger 31 and an end of a heater valve 34.

The heater capillary tube 32 has an outlet connected to a pipe P9 that is branched into pipes P10, P11. The pipe P10 has an outlet end connected to a drier valve 35, and the pipe p11 has an outlet end connected to a pipe P12 which is connected to an outlet of the heat exchanger 31 and also to a pipe P13 that is connected to an end of a cooler capillary tube 36. The heat exchanger 31 is associated with a fan 33 for cooling the heat exchanger 31 with external air.

The heater valve 34 has an outlet connected to a pipe P14 that is branched into pipes P15, P16 which are connected respectively to an additional valve 38 and a second heat exchanger 40 as a second cooling means.

The drier valve 35 and the cooler capillary tube 36 have respective outlets connected to pipes P17, P18 that are joined into a pipe P19. The pipe P19 has an outlet end connected to a pipe P20 which is connected to an outlet of the additional valve 38 and also to a pipe P21.

The pipe 21 has an outlet end connected to an inlet of an evaporator (also referred to as "passenger compartment heat exchanger") 44 disposed in a duct 42. The evaporator 44 has an outlet connected to a pipe P22 which is connected to a pipe P23 connected to an outlet of the second heat exchanger 40 and also to a pipe P24 connected to the receiver tank 26.

The duct 42 is disposed in an instrumental panel, not shown, positioned in a front area of the passenger compartment of the electric vehicle. The duct 42 has in its upstream area an internal air inlet 46 for introducing air in the passenger compartment and an external air inlet 48 for introducing air outside of the passenger compartment. The internal air inlet 46 and the external air inlet 48 are selectively openable and closable by a damper 50.

A blower (also referred to as "passenger compartment blower") 52 is disposed in the duct 42 near the damper 50. The evaporator 44 is disposed downstream of the blower 52.

A heater core 56 is disposed in the duct 42 downstream of the evaporator 44. The heater core 56 serves as part of a heating liquid circulation circuit 54. An air mixing damper 58 is located on an inlet end of the heater core 56.

The duct 42 has an outlet end connected to a defrosting outlet, not shown, for applying air to the inner surface of a front windshield of the electric vehicle, a face outlet, not shown, for applying air to the face of a passenger in the passenger compartment, and a foot outlet, not shown, for applying air to the feet of a passenger in the passenger compartment.

The heating liquid circulation circuit 54 comprises the heat exchanger 28, a water pump 60, and the heater core 56 which are connected by pipes in a loop configuration. A heating liquid flowing in the heating liquid circulation circuit 54 may comprise a coolant.

The air-conditioning ECU 16 is connected to a passenger compartment temperature sensor and a control panel, not shown. The air-conditioning ECU 16 reads a passenger compartment temperature from the passenger compartment temperature sensor, and controls, through non-illustrated control lines, various actuators described above, i.e., the cooler valve 30, the heater valve 34, the additional valve 38, and the drier valve 35 to open and close them, based on settings entered from the control panel.

The valves 30, 34, 38, 35 comprise solenoid-operated valves that can be opened and closed by electric signals delivered from the air-conditioning ECU 16 via the control lines.

The air-conditioning ECU 16 also controls the turning-on and -off of the fan 33 and the blower 52, the rotational speeds of the fan 33 and the blower 52 when they are turned on, the turning-on and -off of the water pump 60, the amount of water discharged from the water pump 60 when it is turned on, and the opening and closing of the damper 50 and the air-mixing damper 58.

The battery cooling apparatus 14 has a cooling liquid circulation circuit 70 for circulating a cooling liquid such as a coolant or the like. The cooling liquid circulation circuit 70 comprises a first heat exchanger 72 as a first cooling means, the battery 20 (the jacket in the battery 20), and a water pump 74 which are connected by pipes in a loop configuration.

A temperature sensor (also referred to as "temperature detecting means" or "water temperature sensor") 76 for detecting the cooling liquid is disposed in an outlet pipe connected to the battery 20, i.e., downstream of the battery 20 with respect to the flow of the cooling liquid. The temperature sensor 76 supplies a water temperature (also referred to as "battery water temperature" or "battery temperature") Tw to the battery ECU 18.

A battery cooling fan 80 for introducing external air 78 is disposed behind the first heat exchanger 72 in the rearward direction of the electric vehicle, and the second exchanger 40 of the passenger compartment air-conditioning apparatus 12 is disposed in front of the first heat exchanger 72 in the forward direction of the electric vehicle and adjacent to the first heat exchanger 72.

When the battery cooling fan 80 is rotated, the external air 78 that is cooled by the second heat exchanger 40 is applied to, i.e., introduced into, the first heat exchanger 72, cooling the first heat exchanger 72. The cooling liquid that flows in the first heat exchanger 72 is thus cooled. When the water pump 74 is operated, the cooling liquid from the first heat exchanger 72 cools the battery 20.

The turning-on and -off of the water pump 74, the amount of water discharged from the water pump 74 when it is turned on, the turning-on and -off of the battery cooling fan 80, and the rotational speed of the battery cooling fan 80 when it is turned on are controlled by the battery ECU 18.

The air-conditioning system 10 which incorporates the battery cooling apparatus 14 is basically constructed as described above. Operation of the air-conditioning system 10 including the battery cooling apparatus 14 will be described below with reference to FIGS. 2 and 3 with respect to a mode for charging the battery 20 when the battery 20 needs to be cooled most. In this operation, the battery ECU 18 functions as a controller to control various components.

Figure 2:
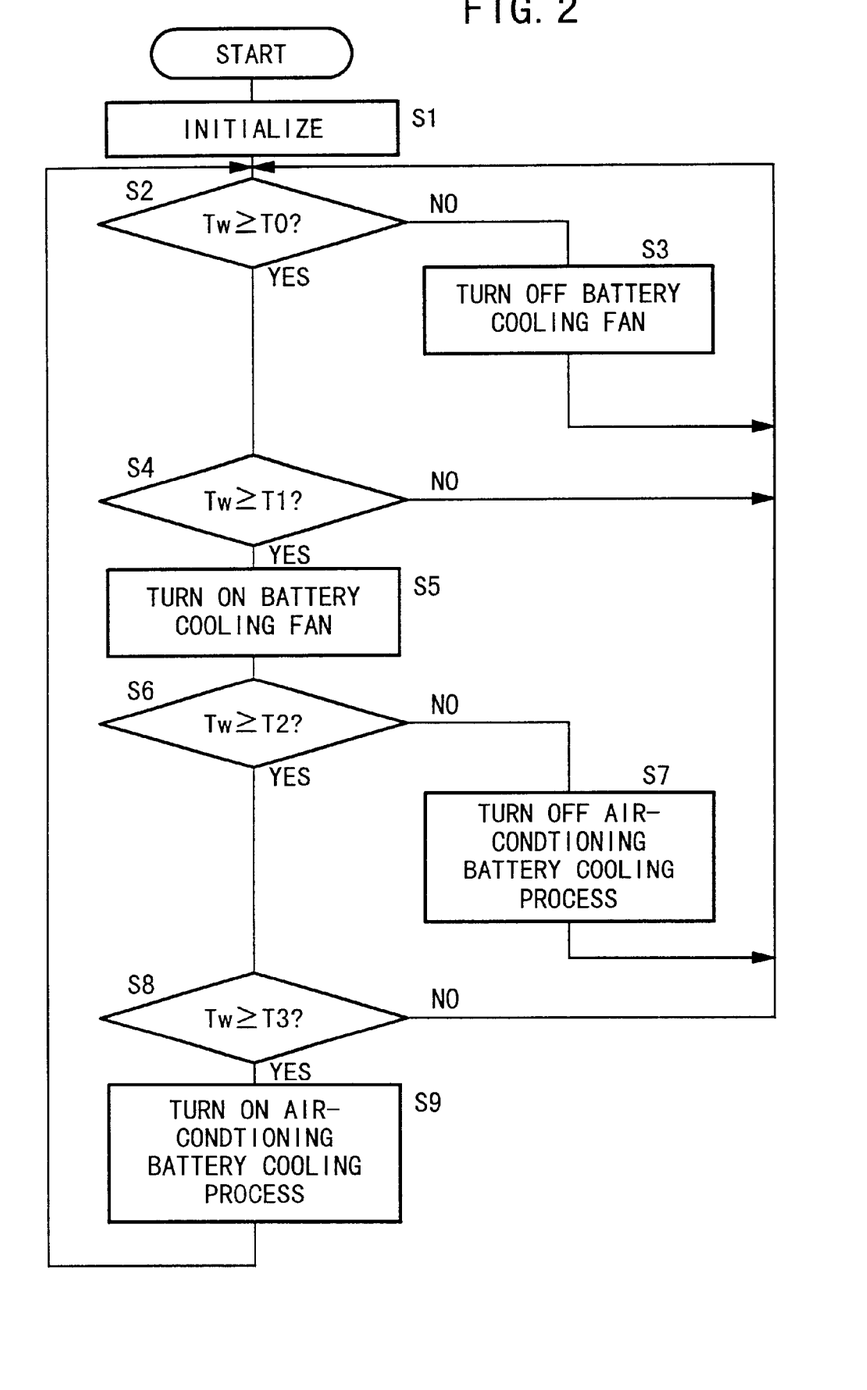
FIG. 2 is a flowchart of an operation sequence of the vehicle battery cooling apparatus according to the present invention.

When the battery 20 is charged, the electric vehicle is held at rest, and DC electric energy is supplied through an external or internal charger (not shown) to the battery 20 and the inverter 19.

Initial settings for starting to charge the battery 20 are made in step S1. Specifically, the battery ECU 18 actuates the water pump 74 to circulate the cooling liquid such as a coolant through the cooling liquid circulation circuit 70 for thereby cooling the battery 20 with the cooling liquid only. The battery cooling fan 80 for cooling the battery 20 is initially turned off.

Whether the passenger compartment air-conditioning apparatus 12 is to be actuated, i.e., turned on, or not is manually determined by the user of the control panel connected to the air-conditioning ECU 16 or automatically determined as described below. For an easier understanding of the invention, it is assumed that the battery 20 starts being charged with the passenger compartment air-conditioning apparatus 12 being turned off.

In step S2, the battery ECU 18 detects the temperature of the cooling liquid as a battery temperature Tw with the temperature sensor 76. The battery ECU 18 determines whether or not the detected battery temperature Tw is equal to or higher than a lowest reference temperature T0 (Tw≧T0) of a plurality of reference temperatures T0 through T3 (which are preset respectively to T0=0° C., T1=10° C., T2=15° C., T3=20° C., for example) shown in FIG. 3.

If the detected battery temperature Tw is not equal to or higher than the lowest reference temperature T0 (Tw<T0) in step S2, then the battery ECU 18 turns off the battery cooling fan 80, i.e., keeps the battery cooling fan 80 turned off in this case, and control returns to step S2.

If the detected battery temperature Tw is equal to or higher than the lowest reference temperature T0 (Tw≧T0) in step S2, then the battery ECU 18 determines whether or not the battery temperature Tw is equal to or higher than the reference temperature T1 (T>T0) (Tw≧T1) or not. If not Tw≧T1, i.e., if Tw<T1, then control goes back to step S2. If Tw≧T1, then the battery ECU 18 turns on the battery cooling fan 80 in step S5.

The first heat exchanger 72 that is disposed outside of the passenger compartment is now forcibly cooled by the external air 78, and hence the cooling liquid flowing in the first heat exchanger 72 is also cooled by the external air 78. Since the cooling liquid that is flowing through the cooling liquid circulation circuit 70 with the water pump 74 is cooled, the battery 20 is cooled by the cooling liquid.

In step S6, the battery ECU 18 determines whether or not the battery temperature Tw is equal to or higher than the reference temperature T2 (T2>T1) (Tw<T2).

If the battery temperature Tw is lower than the reference temperature T2 (Tw<T2), then the battery ECU 18 turns off, in step S7, an air-conditioning battery cooling process for cooling the battery 20 together with the second heat exchanger 40, which is disposed outside of the passenger compartment, of the air-conditioning system 10, i.e., keeps the passenger compartment air-conditioning apparatus 12 turned off in this case.

If the battery temperature Tw is equal to or higher than the reference temperature T2 (Tw≧T2) in step S6, then the battery ECU 18 determines whether or not the battery temperature Tw is equal to or higher than the highest reference temperature T3 (Tw≧T3) in step S8. If the battery temperature Tw is lower than the highest reference temperature T3 (Tw<T3), then control returns to step S2.

If the battery temperature Tw is equal to or higher than the highest reference temperature T3 (Tw≧T3) in step S8, then the battery ECU 18 requests the air-conditioning ECU 16 to automatically turn on the passenger compartment air-conditioning apparatus 12 to initiate the air-conditioning battery cooling process for cooling the battery 20 in step S9. If the passenger compartment air-conditioning apparatus 12 is automatically turned on because of an increase of the battery temperature Tw in excess of the reference temperature T3 while the battery 20 is being charged, then a visual indicator or a loudspeaker may be energized to let the user know that the passenger compartment air-conditioning apparatus 12 is automatically turned on for that reason.

Figure 3:
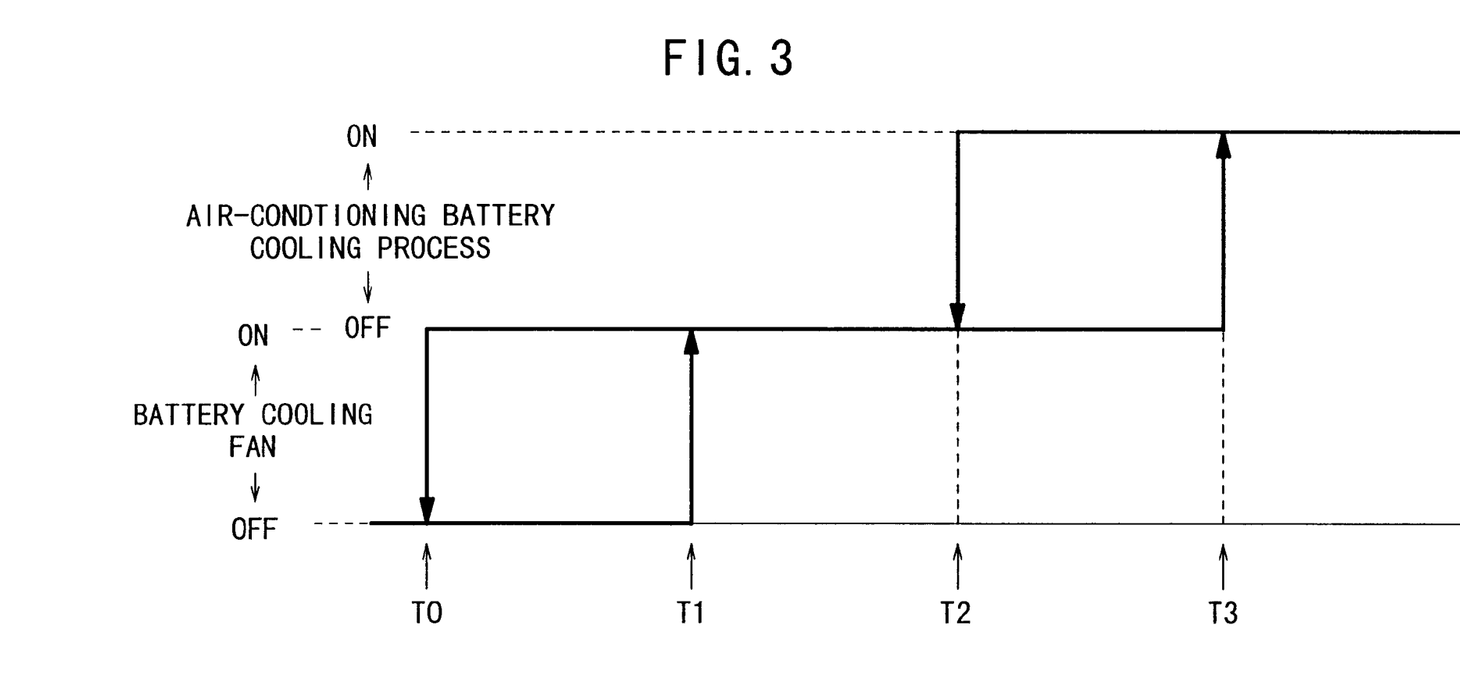
FIG. 3 is a diagram showing a temperature hysteresis used in the operation sequence shown in FIG. 2.

The passenger compartment air-conditioning apparatus 12 is controlled to turn on or off the battery cooling fan 80 and initiate the air-conditioning battery cooling process with a temperature hysteresis shown in FIG. 3 to prevent the passenger compartment air-conditioning apparatus 12 from operating unstably due to hunting.

More specifically, if the battery temperature Tw is increasing and in a temperature range that is equal to or higher than the reference temperature T1 but lower than the reference temperature T3, then the air-conditioning ECU 16 and the battery ECU 18 cool the battery 20 with only the cooling liquid circulation circuit 70 which has the first heat exchanger 72 and the battery cooling fan 80. If the battery temperature Tw exceeds the reference temperature T3, then the air-conditioning ECU 16 and the battery ECU 18 operate the passenger compartment air-conditioning apparatus 12 to activate the second heat exchanger 40 for cooling the battery 20 with both the cooling liquid circulation circuit 70 and the passenger compartment air-conditioning apparatus 12. If the battery temperature Tw is decreasing from the higher temperature, then the air-conditioning ECU 16 and the battery ECU 18 keep both the cooling liquid circulation circuit 70 and the passenger compartment air-conditioning apparatus 12 operating until the battery temperature Tw falls to the reference temperature T2 lower than the reference temperature T3. If the battery temperature Tw becomes lower than the reference temperature T2, then the air-conditioning ECU 16 and the battery ECU 18 cool the battery 20 with only the cooling liquid circulation circuit 70. If the battery temperature Tw further decreases to a temperature lower than the reference temperature T0, then the air-conditioning ECU 16 and the battery ECU 18 turn off the battery cooling fan 80.

Operation of the air-conditioning system 10 with the air-conditioning battery cooling process which uses the passenger compartment air-conditioning apparatus 12 being turned on based on the water temperature information (Tw≧T3) from the battery ECU 18 if the condition in step S8 is satisfied (Tw≧T3) will be described below.

If the condition in step S8 is satisfied (Tw≧T3), then the passenger compartment air-conditioning apparatus 12 is automatically turned on to perform the process in step S9. At this time, the passenger compartment air-conditioning apparatus 12 operates in either a cooling mode, a dehumidifying mode, or a heating mode. If the present mode of operation of the passenger compartment air-conditioning apparatus 12 is the same as the mode thereof when the motor of the electric vehicle was turned off in a preceding running cycle or the passenger compartment air-conditioning apparatus 12 is an automatic air-conditioning apparatus, then the passenger compartment air-conditioning apparatus 12 starts to operate in a mode based on conditions determined by the air-conditioning ECU 16.

Figure 4:
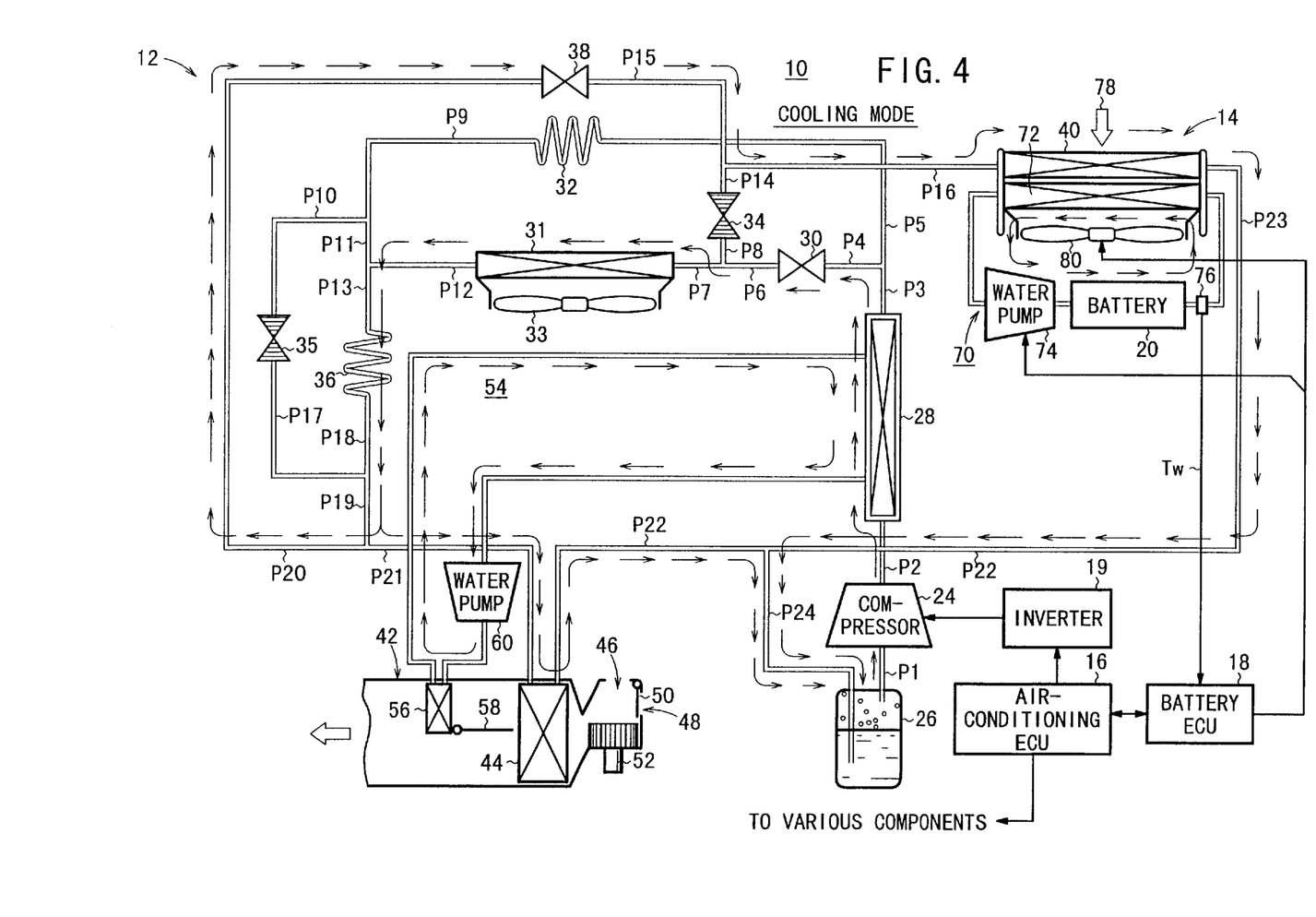
FIG. 4 is a block diagram showing a refrigerant passage of the air-conditioning system when the air-conditioning system operates in a cooling mode which also cools a battery.

If the passenger compartment air-conditioning apparatus 12 is already in the cooling mode (which also cools the battery 20) before the condition in step S8 is satisfied, or if the processing in step S9 is started when the condition in step S8 is satisfied and the cooling mode is automatically started, then the air-conditioning ECU 16 closes the heater valve 34 and the drier valve 35, both shown hatched in FIG. 4, and opens the cooler valve 30 and the additional valve 38. In FIG. 4, arrows drawn along pipes indicate the direction in which the refrigerant flows or the direction in which the cooling liquid flows.

At this time, the compressor 24 is actuated by the air-conditioning ECU 16 through the inverter 19. The refrigerant supplied from the receiver tank 26 is converted by the compressor 24 into a gas refrigerant at a high temperature under a high pressure, which is supplied to the heat exchanger 28.

The heat exchanger 28 then converts the gas refrigerant into a gas-liquid-mixture refrigerant at a high temperature under a high pressure. The water pump 60 is operated by the air-conditioning ECU 16 to heat the heater core 56 through the heating liquid circulation circuit 54.

The gas-liquid-mixture refrigerant discharged from the heat exchanger 28 is converted into a liquid refrigerant at a high temperature under a high pressure by the heat exchanger 31 to which external air is applied by the fan 33. At this time, since the heater capillary tube 32 has a large flow resistance, almost none of the gas-liquid mixture refrigerant discharged from the heat exchanger 28 flows to the heater capillary tube 32.

The liquid refrigerant from the heat exchanger 31 is expanded by the cooler capillary tube 36 into a mist gas-liquid mixture refrigerant at a low temperature under a low pressure. At this time, the refrigerant does not flow back into the heater capillary tube 32 because a high pressure is developed in the other end (connected to the pipe P5) of the heater capillary tube 32.

The mist gas-liquid mixture refrigerant discharged from the cooler capillary tube 36 is supplied to the evaporator 44 in the duct 42 for a heat exchange with external air. When the blower 52 is rotated by the air-conditioning ECU 16, the evaporator 44 cools the external air with the mist gas-liquid mixture, and discharges cool air to the outlet of the duct 42.

The mist gas-liquid mixture refrigerant discharged from the cooler capillary tube 36 is also supplied via the pipe P20, the additional valve 38, the pipes P15, P16 to the second heat exchanger 40.

The battery cooling fan 80 which has already been operated in step S5 introduces the external air 78 into the second heat exchanger 40, which converts the external air 78 into cool air that is supplied to cool the first heat exchanger 72. When the first heat exchanger 72 is cooled, the cooling liquid circulating in the cooling liquid circulation circuit 70 is cooled, thus further cooling the battery 20. Even when the ambient temperature is high because the battery 20 is charged in a quick charge mode, the battery 20 can thus be cooled highly effectively using the passenger compartment air-conditioning apparatus 12. Therefore, the battery 20 can smoothly be charged. If the ambient temperature is not so high, the battery 20 can be cooled with reduced power by only the battery cooling fan 80 and the cooling liquid circulation circuit 70.

The gas refrigerant discharged from the evaporator 44 and the second heat exchanger 40 is introduced into the receiver tank 26.

In FIG. 4, the battery 20 is cooled in the cooling mode of the passenger compartment air-conditioning apparatus 12 while the battery 20 is being charged. However, the battery 20 can also be charged when the passenger compartment air-conditioning apparatus 12 operates in the dehumidifying heating mode or the heating mode. Processes of cooling the battery 20 in the dehumidifying heating mode and the heating mode will briefly be described below.

Figure 5:
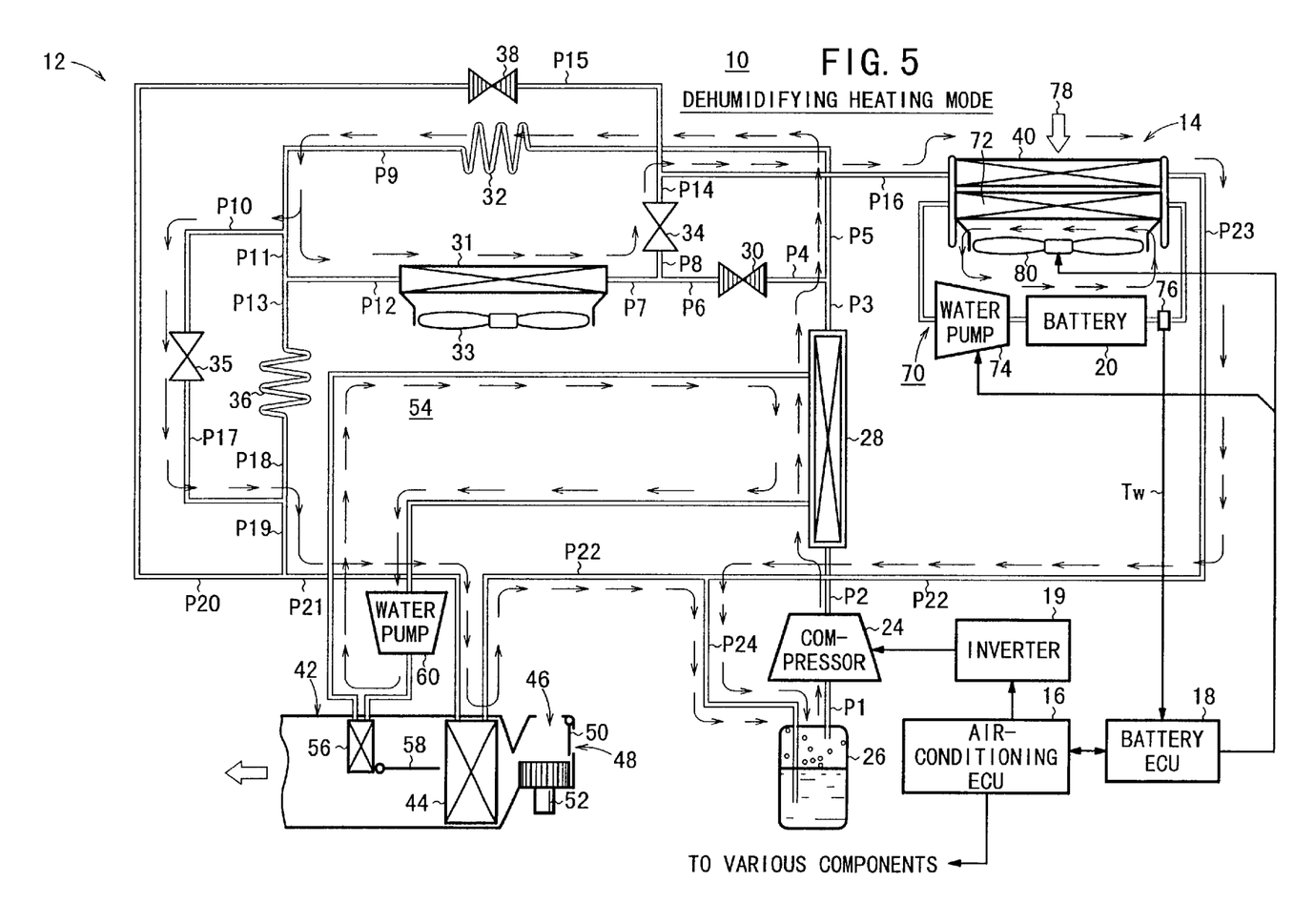
FIG. 5 is a block diagram showing a refrigerant passage of the air-conditioning system when the air-conditioning system operates in a dehumidifying heating mode.

FIG. 5 shows a refrigerant passage in the passenger compartment air-conditioning apparatus 12 when it operates in the dehumidifying heating mode in step S9 when the condition in step S8 is satisfied. In FIG. 5, arrows drawn along pipes indicate the direction in which the refrigerant flows or the direction in which the cooling liquid flows. In the dehumidifying heating mode, the air-conditioning ECU 16 closes the cooler valve 30 and the additional valve 38, both shown hatched in FIG. 5, and opens the heater valve 34 and the drier valve 35.

At this time, the refrigerant discharged from the compressor 24 flows through the heat exchanger 28, the heater capillary tube 32, the heat exchanger 31, the heater valve 34, and the second heat exchanger 40 back to the receiver tank 26, and also flows through the capillary tube 32, the drier valve 35, and the evaporator 44 back to the receiver tank 26. The battery cooling fan 80 introduces the external air 78 into the second heat exchanger 40, which converts the external air 78 into cool air that is supplied to cool the first heat exchanger 72. When the first heat exchanger 72 is cooled, the cooling liquid circulating in the cooling liquid circulation circuit 70 is cooled, thus further cooling the battery 20.

Figure 6:
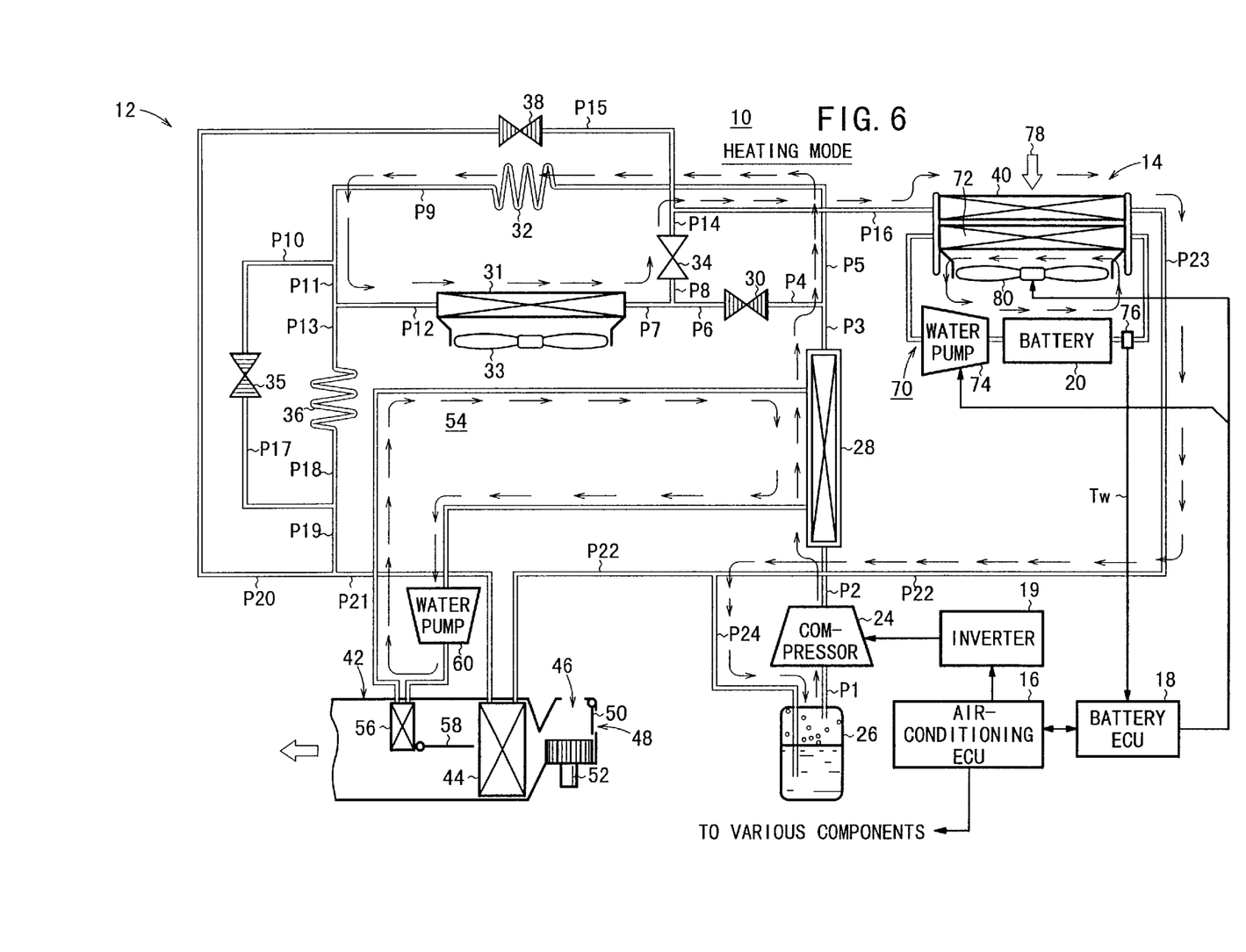
FIG. 6 is a block diagram showing a refrigerant passage of the air-conditioning system when the air-conditioning system operates in a heating mode.

FIG. 6 shows a refrigerant passage in the passenger compartment air-conditioning apparatus 12 when it operates in the heating mode in step S9 when the condition in step S8 is satisfied. In FIG. 6, arrows drawn along pipes indicate the direction in which the refrigerant flows. In the heating mode, the air-conditioning ECU 16 closes the cooler valve 30, the additional valve 38, the drier valve 35, all shown hatched in FIG. 6, and opens the heater valve 34.

At this time, the refrigerant discharged from the compressor 24 flows through the heat exchanger 28, the heater capillary tube 32, the heat exchanger 31, the heater valve 34, and the second heat exchanger 40 back to the receiver tank 26. The battery cooling fan 80 introduces the external air 78 into the second heat exchanger 40, which converts the external air 78 into cool air that is supplied to cool the first heat exchanger 72. When the first heat exchanger 72 is cooled, the cooling liquid circulating in the cooling liquid circulation circuit 70 is cooled, thus further cooling the battery 20.

In the above embodiment, as described above, the battery cooling apparatus 14 on the electric vehicle uses the first heat exchanger 72 as the first cooling means to cool the cooling liquid for cooling the battery 20 with the external air 78 that is introduced by the battery cooling fan 80. The battery cooling apparatus 14 also has the second heat exchanger 40 as the second cooling means of the passenger compartment air-conditioning apparatus 12, which is disposed adjacent to and in front of the first heat exchanger 72 in a forward direction of the electric vehicle, to cool the battery 20.

The battery cooling apparatus 14 does not require a refrigerant passage to be provided around the battery 20, unlike the first technical proposal described above, and also does not require an absorption refrigerator to cool the battery 20. Therefore, the battery cooling apparatus 14 needs a small installation space and minimizes any increase in its cost.

The present invention is not limited to the cooling of the battery 20 that is mounted on the electric vehicle which has the battery 20 as the energy source and the electric motor as the propulsion source. The principles of the present invention are also applicable to a cooling apparatus for cooling a battery for energizing an electric motor on a hybrid vehicle (hybrid electric vehicle) which uses an internal combustion engine and the electric motor as propulsion sources, and a cooling apparatus for cooling a battery for energizing an electric motor on a hybrid vehicle which uses the electric motor powered by a fuel battery and the battery as a propulsion source.

Since the battery cooling apparatus according to the present invention has the first and second cooling means, they can selectively be used depending on the cooling capability required to cool the battery.

Specifically, if the ambient temperature is relatively low even when the battery is charged in a quick charge mode, then the battery is cooled by the first cooling means which employs the fan. If the ambient temperature is relatively high when the battery is charged in the quick charge mode, then the battery is cooled by the second cooling means which employs the air-conditioning system as well as by the first cooling means.

With the above arrangement, the battery can smoothly be charged in the quick charge mode. The battery cooling apparatus can provide an optimum cooling arrangement depending on the temperature of the battery to be cooled.

Inasmuch as no refrigerant passage needs to be provided around the battery 20, the battery cooling apparatus has a simple, inexpensive, and highly reliable cooling arrangement.

Although a certain preferred embodiment of the present invention has been shown and described in detail, it should be understood that various changes and modifications may be made therein without departing from the scope of the appended claims.

What is claimed is:

1. An apparatus for cooling a battery mounted on a vehicle, comprising:
    first cooling means for cooling a cooling liquid to cool the battery with external air introduced by a fan; and
    second cooling means disposed adjacent to and in front of said first cooling means in a forward direction of the vehicle, for cooling said first cooling means with a passenger compartment air-conditioning apparatus on the vehicle.

2. An apparatus according to claim 1, wherein said first cooling means comprises a first heat exchanger disposed outside of a passenger compartment of the vehicle, for cooling said cooling liquid, and said second cooling means comprises a second heat exchanger branched from a refrigerant circulation passage of said passenger compartment air-conditioning apparatus and disposed outside of said passenger compartment.

3. An apparatus according to claim 1, further comprising:
    temperature detecting means for detecting a battery temperature of said battery; and
    control means connected to said temperature detecting means and said first and second cooling means, for controlling operation of said first and second cooling means based on the battery temperature detected by said temperature detecting means.

4. An apparatus according to claim 3, wherein said first cooling means comprises a first heat exchanger disposed outside of a passenger compartment of the vehicle, for cooling said cooling liquid, and said second cooling means comprises a second heat exchanger branched from a refrigerant circulation passage of said passenger compartment air-conditioning apparatus and disposed outside of said passenger compartment.

5. An apparatus according to claim 3, wherein said control means comprises means for operating only said first cooling means to cool said battery when the battery temperature detected by said temperature detecting means is increasing and exceeds a predetermined reference temperature, and operating both said first and second cooling means to cool said battery when the battery temperature detected by said temperature detecting means is increasing further and exceeds a predetermined reference temperature higher than said predetermined reference temperature.

6. An apparatus according to claim 5, wherein said first cooling means comprises a first heat exchanger disposed outside of a passenger compartment of the vehicle, for cooling said cooling liquid, and said second cooling means comprises a second heat exchanger branched from a refrigerant circulation passage of said passenger compartment air-conditioning apparatus and disposed outside of said passenger compartment.

7. An apparatus according to claim 1, wherein said battery comprises a battery mounted on an electric vehicle which has a propulsion source comprising an electric motor powered battery.

8. An apparatus according to claim 1, wherein said battery comprises a battery mounted on a hybrid vehicle which has propulsion sources comprising an internal combustion engine and an electric motor powered battery.

9. An apparatus according to claim 1, wherein said battery comprises a battery mounted on a hybrid vehicle which has a propulsion source comprising an electric motor powered by a fuel battery and said battery.

* * * * *